United States Patent [19]
Wagstaff

[11] Patent Number: 5,408,817
[45] Date of Patent: Apr. 25, 1995

[54] BALE SHAPE MONITORING METHOD FOR ROUND BALERS

[75] Inventor: Robert A. Wagstaff, Lancaster, Pa.

[73] Assignee: New Holland North America, Inc., New Holland, Pa.

[21] Appl. No.: 89,533

[22] Filed: Jul. 12, 1993

[51] Int. Cl.⁶ ..................... A01D 39/00; A01F 15/07
[52] U.S. Cl. .................. 56/341; 56/10.2 R; 56/DIG. 2
[58] Field of Search .............. 56/341, 10.2 R, 16.4, 56/DIG. 2; 100/88, 89

[56] References Cited

U.S. PATENT DOCUMENTS

| | | | |
|---|---|---|---|
| 4,224,867 | 9/1980 | Gaeddert et al. | 100/88 |
| 4,517,795 | 5/1985 | Meiers | 56/341 |
| 4,686,820 | 8/1987 | Andra et al. | 56/341 |
| 4,698,955 | 10/1987 | Wagstaff | 56/341 |
| 4,748,801 | 6/1988 | Sheehan et al. | 56/341 |
| 4,870,812 | 10/1989 | Jennings et al. | 56/341 |
| 5,123,338 | 6/1992 | Mathis | 56/341 X |
| 5,131,214 | 7/1992 | Vermeer | 56/102 |

Primary Examiner—Terry Lee Melius
Attorney, Agent, or Firm—Frank A. Seemar; Larry W. Miller

[57] ABSTRACT

A method of forming bales in a round baler having a crop pickup and a bale forming chamber which is either fixed or expandable during bale formation. In one baler in which the method is readily carried out, the chamber is defined by a flexible apron comprising a plurality of side by side elongated belts trained about a plurality of rolls, a series of transverse crop engaging rolls and a floor roll. The method includes the steps of positioning the round baler to pick up crop material with the pickup, feeding the picked up crop material into the expandable bale forming chamber, sensing the compaction of the crop material in one or more regions during its formation in the bale forming chamber, generating a signal indicative of the level of compaction of the crop material in the region or regions, and repositioning the round baler in response to variations in the signal during expansion of the chamber to maintain the compaction at a predetermined level.

14 Claims, 5 Drawing Sheets

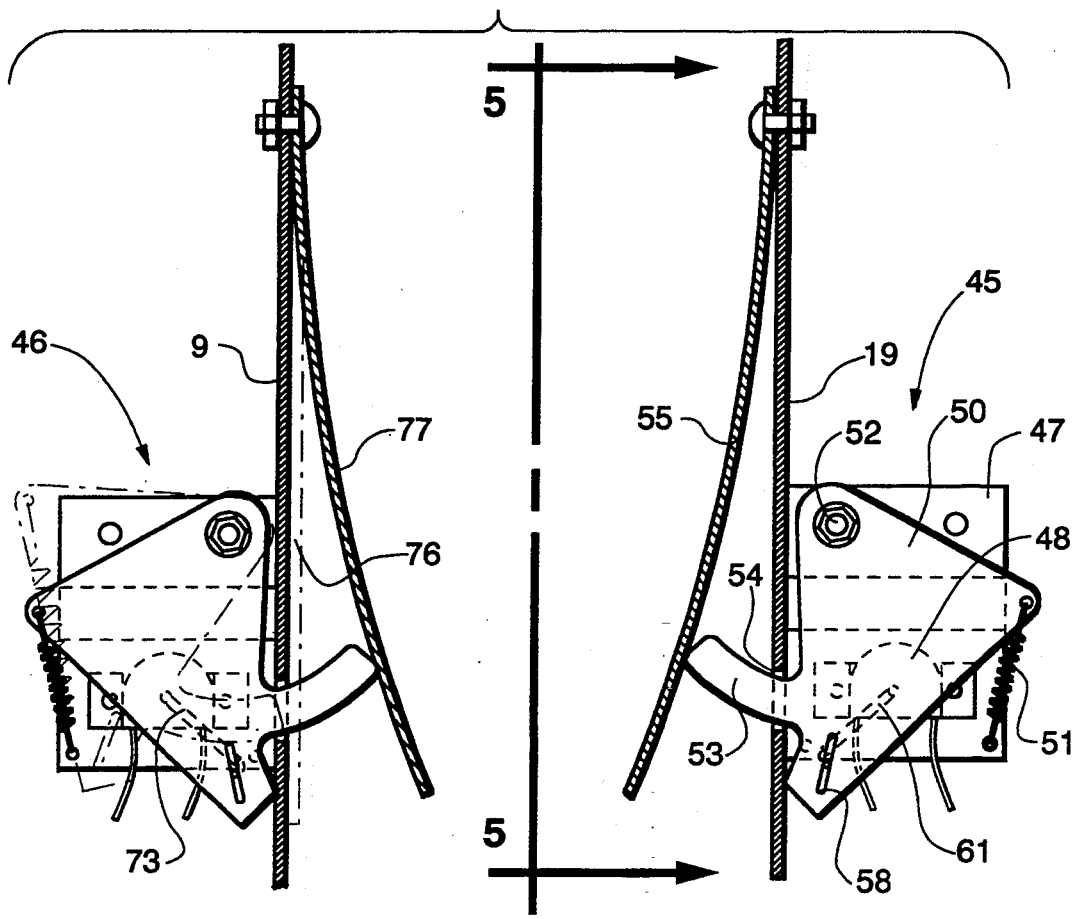
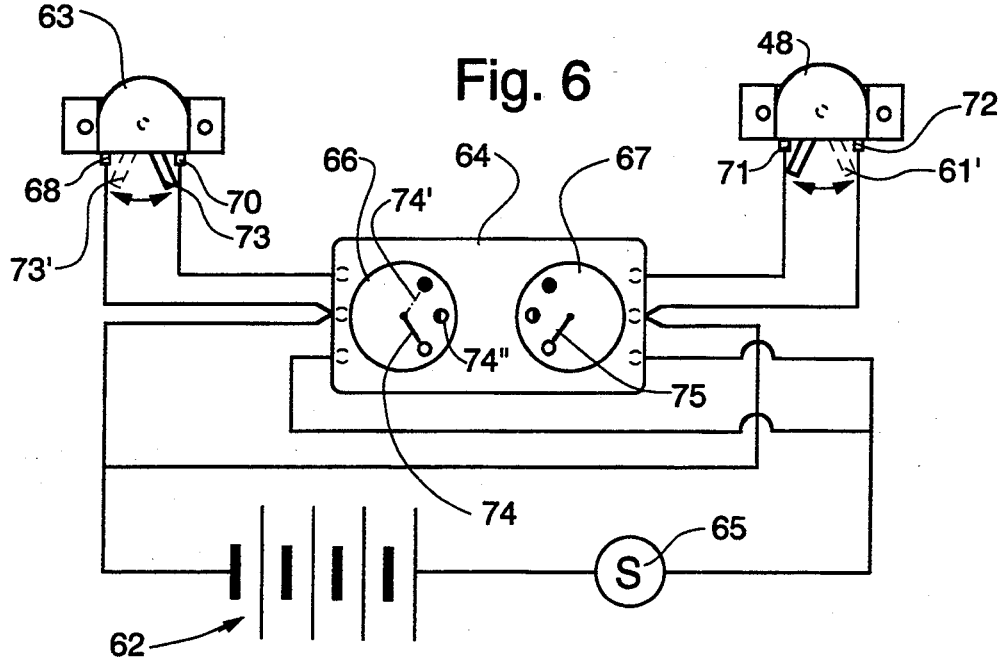

BALE SHAPE MONITORING METHOD FOR ROUND BALERS

FIELD OF THE INVENTION

The present invention relates generally to round balers and more particularly to a method for controlling bale shape by monitoring the compactness of the crop material in the bale forming chamber.

BACKGROUND OF THE INVENTION

Round balers generally have a bale forming chamber defined by a pair of opposing side walls associated with an array of side-by-side belts, transverse slats trained on chains, a plurality of rolls or a combination of these various elements, e.g., rolls and belts. During field operation, windrowed crop material such as hay is picked up from the ground and fed into a fixed or variable diameter chamber. The hay is then rolled into a cylindrical package, wrapped with twine, net or the like and ejected onto the ground for subsequent handling.

Because it is not uncommon for windrows of crop material to be uneven and typically narrower than the width of the bale forming chamber, it is necessary for the operator of some prior art balers to observe the shape of the bale being formed and weave the baler in a generally zigzag pattern to uniformly distribute hay across the bale being formed and thereby avoid poorly shaped bales. This approach relies on the experience of the operator to determine when to laterally shift the position of the baler. The lack of exactness, inability to observe the bale shape, reliance on operator skill and operator fatigue all contribute to the possibility of improper feeding causing misshaped bales.

In bales formed in belt type balers when a substantially uniform diameter is not maintained, improper tracking occurs resulting in belt jamming and damage. In addition, the uneven shape of the bale causes low density areas on the bale periphery which could result in premature deterioration of the bale during field storage, where it is exposed to weather extremes, i.e., the low density area does not shed water as well as an evenly balanced and uniformly compacted area.

Operators of present day balers of the various types mentioned above recognize the need to conveniently and consistently form bales having a substantially uniform diameter throughout their length. This is accomplished to a certain degree by utilizing monitoring methods to ascertain parameters that in turn are used in the control of functions that have a direct bearing on bale shape. A control technique of this type is embodied in the system disclosed in U.S. Pat. No. 4,748,801, issued Jun. 7, 1988, 1979 in the name of Ronald T. Sheehan, et al. This system includes bale diameter monitoring apparatus for alternately generating first and second signals in response to predetermined incremental expansion of the bale forming chamber. This enables the operator to position the baler to feed crop to one side of the bale forming chamber when one signal is generated and to position the baler to feed crop to the other side of the chamber when the other signal is generated.

In U.S. Pat. Nos. 4,224,867, issued Sep. 30, 1980 in the name of Melvin V. Gaeddert, et al, and 4,517,795, issued May 21, 1985 in the name of Gerald F. Meiers, similar prior art techniques are disclosed in which a monitor senses belt tension as a bale is being formed and generates signals to the operator directly related to relative diameters. This enables the operator to steer the baler in a manner that will feed crop material to the area in the chamber that is deficient.

In another technique, embodied in the apparatus disclosed in U.S. Pat. No. 4,686,820, issued Aug. 18, 1987, in the name of Bryan K. Andra, et al, belt tension is again utilized to generate a signal. Control apparatus responds to the signal to deflect crop material into one of three regions of the chamber based on diameter differentials.

In yet another prior art technique, embodied in the apparatus disclosed in U.S. Pat. No. 5,131,214, issued Jul. 21, 1992, in the name of Gary J. Vermeer, crop being fed is monitored to assist the operator in the formation of round bales. The monitor in this system comprises an interval timer which signals the operator to direct crop material to alternate sides of the baler at preselected time intervals.

The existing round baler monitoring techniques described above in conjunction with various prior art bale forming methods, either monitor the general bale diameter, relative diameters or the time interval during which crop is fed.

SUMMARY OF THE INVENTION

An important object of the present invention is to provide an improved bale forming method in which a novel monitoring technique is employed to improve uniformity of bale shape and thereby enhancing overall baler performance.

In pursuance of this and other important objects the present invention provides for a new and improved method of forming bales in a round baler of the type having a bale forming chamber and a crop pickup for feeding crop material to said chamber. More specifically, the method includes the steps of positioning the round baler to pick up crop material with the pickup, feeding the picked up crop material into the bale forming chamber, sensing the compaction of crop material in one or more regions of the bale being formed after the crop material is fed into the chamber, generating a signal indicative of the compaction at such one or more regions, and repositioning the baler in response to the signal to maintain the compaction at a predetermined level. In a more limited version the method contemplates a generating step that is performed by generating signals indicative of the compaction of both ends of the bale as it is being formed, and by indicating the relative degree of compactness above the predetermined level.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 4 is a view taken in the direction of arrows 4—4 in FIG. 1.

FIG. 6 is a schematic diagram of the electrical circuit for a system in which the present invention can be carried out.

DESCRIPTION OF THE PREFERRED EMBODIMENT

Figure 1:
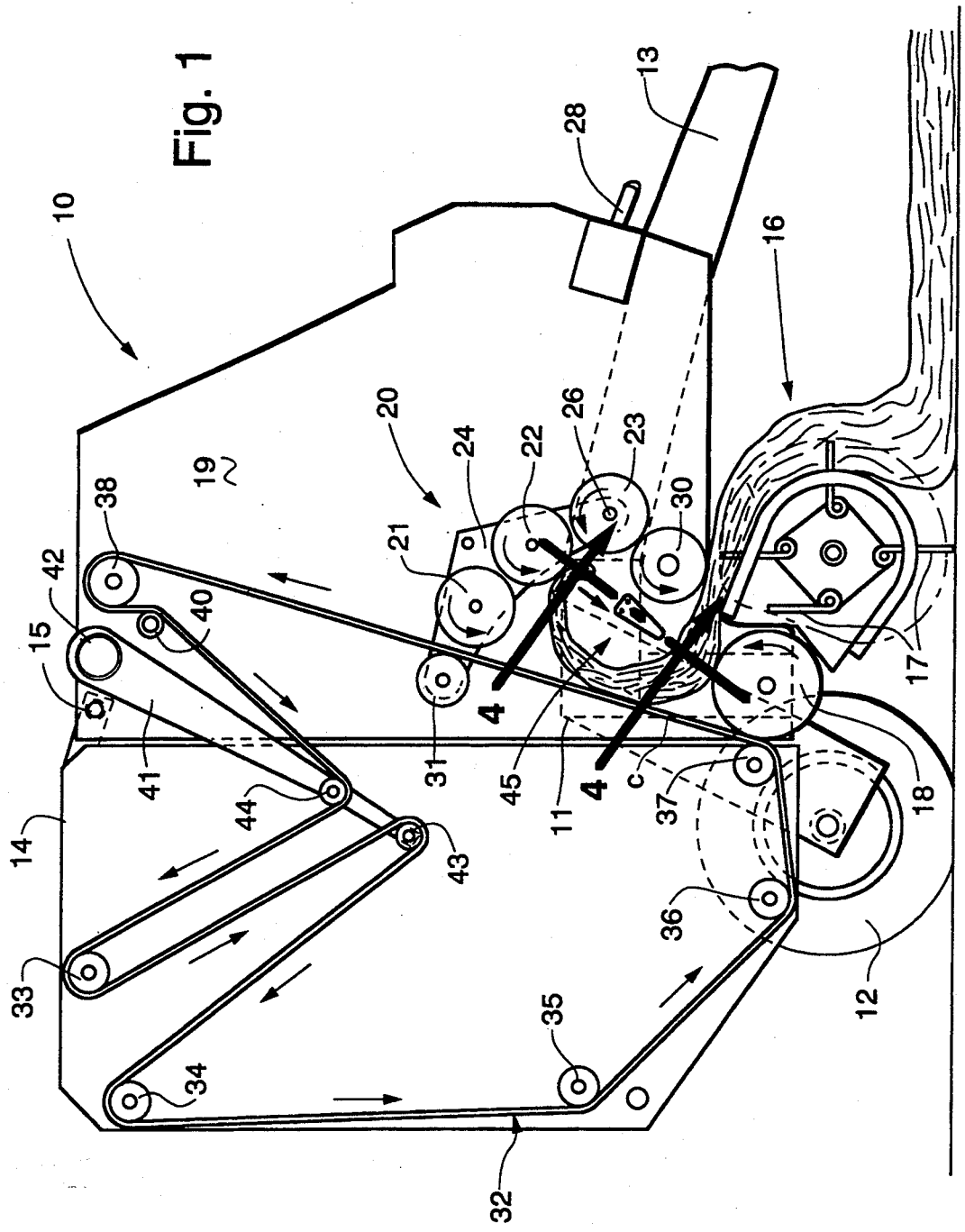
FIG. 1 is a diagrammatic side elevational view of a round baler in which the present invention can be carried out.

Referring to the drawings for a description of a baler in which the present invention is readily carried out, FIG. 1 shows a round baler 10 having an expandable chamber defined in part by belts and rollers, as disclosed in U.S. Pat. No. 4,870,812, issued Oct. 12, 1989 in the name of Richard E. Jennings, et al. Baler 10 has a main frame 11, including a pair of side walls, supported by a pair of wheels 12 (only one shown). A forwardly mounted tongue 13 is provided on main frame 11 for connection to a tractor. Pivotally connected to a side wall 19 by a pair of stub shafts 15 is a tailgate 14 which is closed during bale formation. A pickup 16, mounted on main frame 11, includes tines 17 movable in a predetermined path to lift crop material from the ground and deliver it to a floor roll 18, rotatably mounted on main frame 11.

A chamber for forming bales is defined partly by a sledge assembly 20 comprising transversely extending rollers 21, 22, 23 journalled at their ends in a pair of spaced arms 24, one of which is shown. These arms are pivotally mounted on stub shafts 26 for providing movement of sledge assembly 20 from the bale starting position shown in FIG. 1 through the partly full position shown in FIG. 2 to the full bale position shown in FIG. 3. Rollers 21, 22, 23 are driven in a counter-clockwise direction by conventional means coupled to a drive shaft 28. A starter roll 30, mounted on mainframe 11, is also driven counter-clockwise. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported by drive roll 38, mounted on main frame 11. Although apron 32 passes between roller 21 and idler roller 31, it is in engagement only with idler roller 31 and not roller 21. Suitable coupling means (not shown) connected to drive shaft 28 provide rotation of drive roll 38 causing movement of apron 32 in the directions indicated by the arrows in FIGS. 1, 2 and 3. An additional guide roll 40 in the main frame 11 ensures proper engagement between apron 32 and drive roll 38. A pair of take up arms 41 (only one shown) are pivotally mounted on main frame 11 by a cross shaft 42 for movement between inner, intermediate and outer positions shown in FIGS. 1, 2 and 3, respectively. Take up arms 41, which carry additional guide rolls 43, 44 for supporting apron 32, are resiliently urged toward their inner positions (FIG. 1).

When the elements of round baler 10 are disposed as shown in FIG. 1, an inner course c of apron 32 extends between guide roll 37 and idler roll 31 to form the rear wall of the core starting chamber while the inwardly facing surfaces of rollers 21, 22, 23 define in a general manner a rearwardly inclined front wall. Floor roll 18 defines the bottom of the chamber and with starter roller 30 provides an inlet for crop material.

Figure 2:
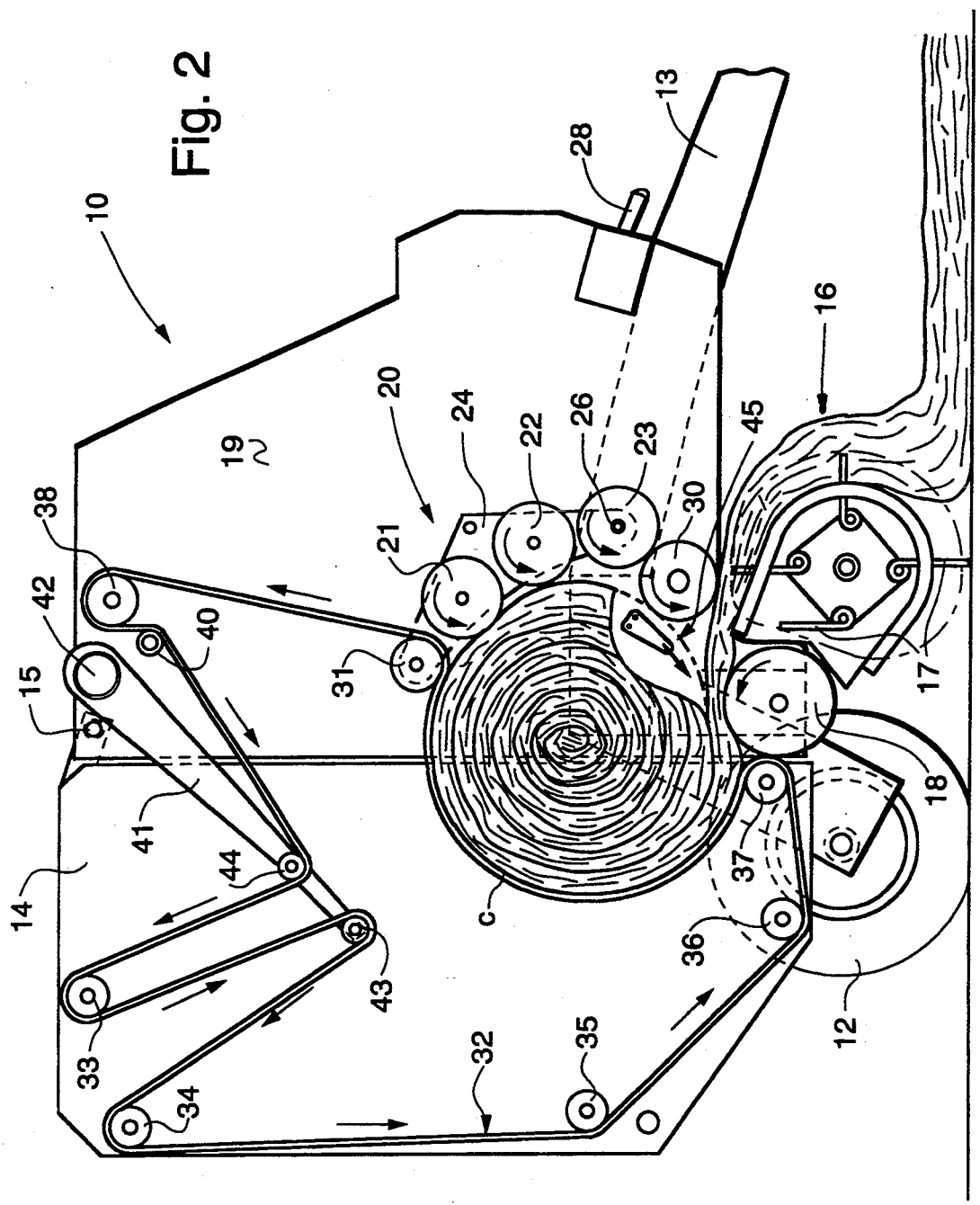
FIG. 2 is similar to FIG. 1 with the bale forming chamber of the baler in its partly full position.

When round baler 10 travels across a field, pickup tines 17 lift crop material from the ground and deliver it through the inlet. The crop material is conveyed by floor roll 18 into engagement with apron inner course c (FIG. 1) which urges it upwardly and forwardly into engagement with the rollers on sledge 20. In this manner crop material is coiled in a clockwise direction to start a bale core. Continued feeding of crop material into the chamber by pickup tines 17 causes apron inner course c to expand in length around a portion of the circumference of the bale core as the diameter increases (FIG. 2). Take up arms 41 rotate from their inner position shown in FIG. 1 toward their outer position shown in FIG. 3 to accommodate expansion of the inner course of the apron in a well known manner, i.e., the outer course of apron 32 is diminished in length while the inner course increases a like amount. After a bale has been formed and wrapped, tailgate 14 is opened and the bale is ejected rearwardly. Subsequent closing of tailgate 14 returns the inner and outer courses of apron 32 to the locations shown in FIG. 1.

Figure 3:
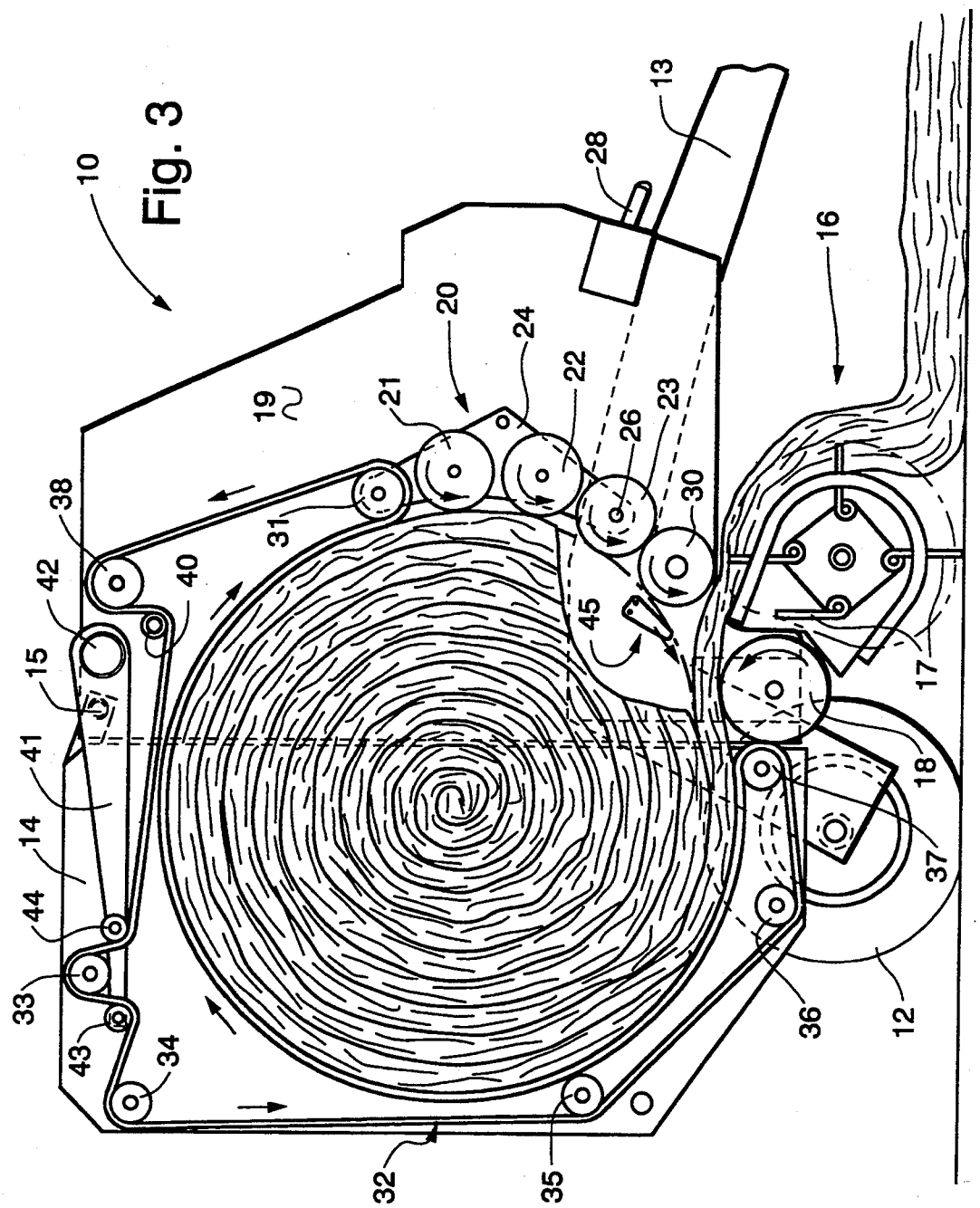
FIG. 3 is also similar to FIG. 1 with the bale forming chamber in its full bale position.

During bale formation, sledge assembly 20 moves between a bale starting position (FIG. 1) to a full bale position (FIG. 3). This movement causes idler roller 31 to move in an arcuate path while maintaining apron 32 in close proximity to roller 21, thereby allowing roller 21 to strip crop material from the belts and prevent or reduce significantly the loss of crop material between roller 21 and apron 32 during bale formation. Sledge assembly 20 is pushed outwardly towards its full bale position during bale formation as the crop material expands against rollers 21, 22, 23 and then subsequently is pulled inwardly by apron 32 to the position shown in FIG. 1.

With the above description and general operation of baler 10 as a background, attention is directed to a sensor assembly 45 mounted on side wall 19, shown in FIGS. 1–3. FIG. 4 shows a pair of sensor assemblies 45, 46, one of which is mounted on side wall 19, as shown in FIGS. 1–3, and the other of which is similarly mounted on the opposing side wall 9, not shown in FIGS. 1–3. For the purposes of this description, assembly 45 will be described in detail but it is intended that like comments apply to assembly 46.

Figure 5:
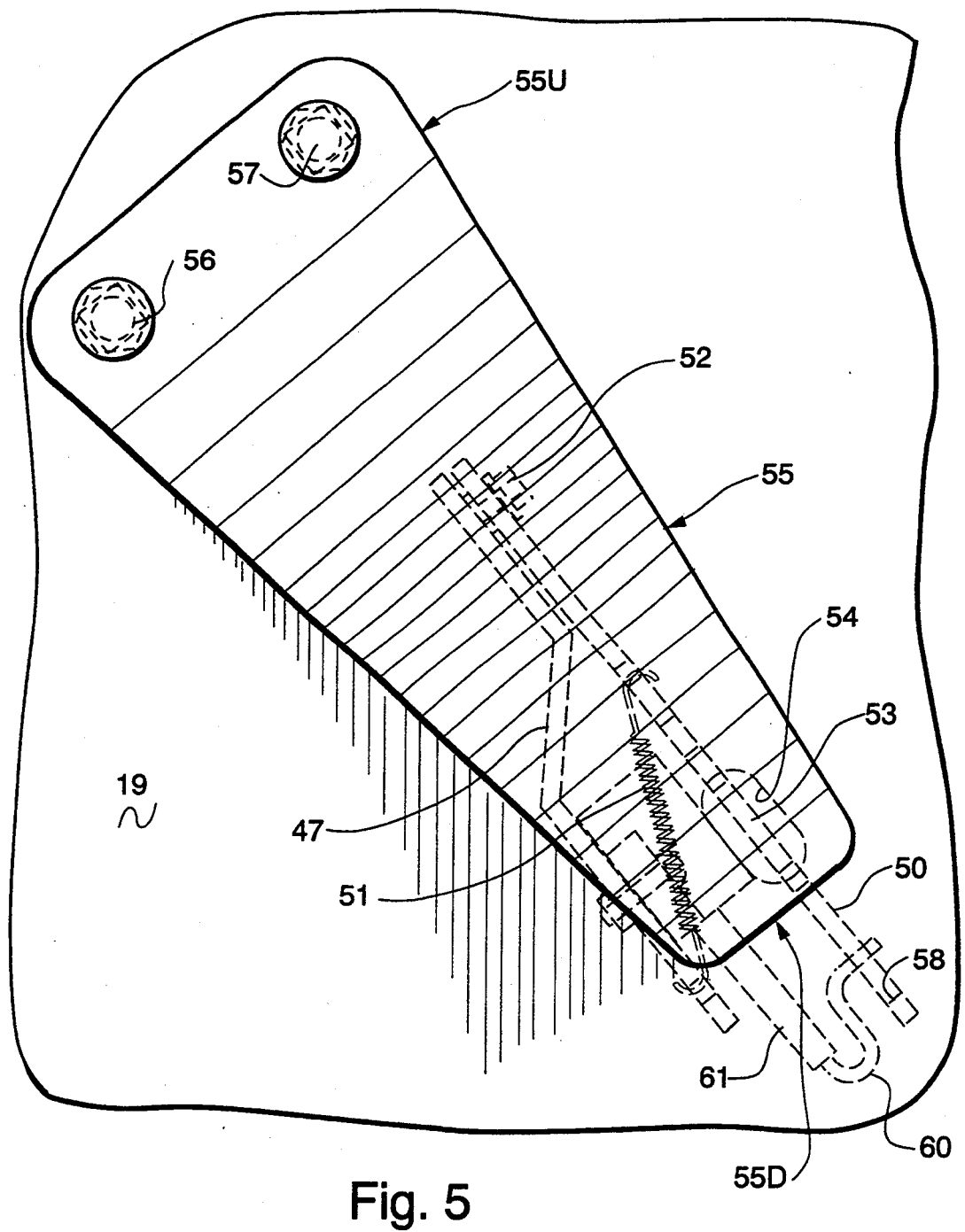
FIG. 5 is a view taken in the direction of arrows 5—5 in FIG. 4.

A bracket 47, affixed to the outer surface of side wall 19, has mounted thereon a potentiometer 48 and a sensor plate 50. A spring 51 engages plate 50 to urge it in a clockwise direction around a pivot 52. Spring 51 holds plate 50 against wall 19, through which a finger 53 extends (via aperture 54) against a leaf spring 55 secured to the inner surface of side wall 19 by conventional means 56, 57 (see FIG. 5).

A slot 58, in plate 50 accommodates an actuator rod 60 extending from a control arm 61. When plate 50 swings about pivot 52, rod 60 traverses slot 58 and thereby moves control arm 61 from the solid position (FIG. 6) to phantom position 61'.

The schematic diagram in FIG. 6 depicts a voltage source 62 connected to potentiometers 48, 63 and signal means 64 by an on/off switch 65. The positive and negative terminals of battery 62 are connected to signal devices 66, 67 which read the varying potential across terminals 68, 70 and 71, 72 of potentiometers 63, 48. When control arms 61, 73 are in the solid positions, i.e., inoperative condition, the signal devices so indicate via the corresponding solid position of indicator needles 74, 75. Variations in potential across the potentiometer terminals causes a like variation at the signal devices, until maximum travel of the control arm is reached. This is illustrated by the phantom position 76 of leaf spring 77, which corresponds to the phantom position 73' of control arm 73 which in turn corresponds to the resulting phantom position 74' of needle 74.

In operation, as mentioned above crop material is conveyed by tines 17 to floor roll 18 which urges it against upwardly traveling course c of apron 32. When the bale forming chamber is empty (FIG. 1) material begins to spiral in a clockwise direction until it engages the rollers of sledge assembly 20 which roll it in a continuing spiral fashion causing course c to expand through the position shown in FIG. 2 to the position shown in FIG. 3. During this bale forming operation, crop material in the region adjacent the side walls in the outer portion of the bale being formed is in continuous contact with leaf springs 55, 77. More specifically, crop material traverses the leaf springs from the upstream end 55U to the downstream end 55D, using spring 55 as an example. The material travels in a generally spiral path and urges leaf springs 77, 55 toward side walls 9, 19. The resulting position of the control arms will vary based on the position of the leaf springs which move toward or away from the side walls based on the force exerted by crop material passing thereover. This force is directly proportional to the degree of compactness of the crop material in the region. The sensor plates in turn move the control arms of the potentiometers, thereby varying the potential in direct relationship to the compactness of the crop material being sensed which is indicated by the signal means in the manner described above.

Thus, as the bale increases in diameter the compactness of the sides is monitored enabling the operator to, firstly, ascertain when the crop material has reached the desired level of compactness and, secondly, to modify the relative quantity of crop material being fed to the transverse sectors of the bale forming chamber in response to the relative levels indicated. For example, if a predetermined acceptable range is established as 74" on signal device 66, after this level is attained the operator observes the signal means to ascertain the degree of compactness on one side relative to the other and steers the baler to the side at which the lower level of compactness is indicated.

While preferred structure in which the present invention is carried out is shown and described above, it is to be understood that the invention is not so limited, and, in fact, widely different means of varying scope and configuration may be employed in the practice of the invention.

Having thus described the invention, what is claimed is:

1. A method of forming bales in a round baler of the type having a crop pickup and a bale forming chamber which is expandable during bale formation, said method comprising the steps of
    positioning said round baler to pick up crop material with said pickup,
    feeding said picked up crop material into said expandable bale forming chamber,
    sensing the compaction of said crop material in one or more regions during its formation in said bale forming chamber,
    generating one or more signals indicative of the level of compaction of said crop material in said one or more regions, and
    repositioning said round baler in response to variations in said signals during expansion of said chamber to maintain said compaction at a predetermined level.

2. A method as set forth in claim 1 including the step of
    observing said one or more signals being generated and the variations therein.

3. A method as set forth in claim 1 wherein the generating step is performed by continuously generating one or more signals indicative of the compaction of crop material in said one or more regions during expansion.

4. A method as set forth in claim 1 wherein the feeding step is performed by feeding crop material along a spiral path after it has entered said expandable chamber.

5. A method as set forth in claim 4 wherein the sensing step is performed by sensing the compaction of crop material as the spiral path passes through at least one of said regions.

6. A method as set forth in claim 5 wherein the sensing step is further performed by sensing the compaction of the crop material that is forming the end of the bale.

7. A method as set forth in claim 6 wherein said generating step is performed by generating signals indicative of the compaction of both ends of the bale as it is being formed, and indicating the relative degree of compactness above said predetermined level.

8. A method as set forth in claim 7 wherein the repositioning step is performed by repositioning the baler in response to said signals indicative of the relative level of compactness above said predetermined level, and by steering the baler to the side at which the lower level of compactness is indicated.

9. A method of forming bales in a round baler of the type having a bale forming chamber and a crop pickup for feeding crop material to said chamber, said method comprising the steps of
    positioning said round baler to pick up crop material with said pickup,
    feeding said picked up crop material into said bale forming chamber,
    sensing the compaction of said crop material in a certain region of the bale being formed after said crop material is fed into said bale forming chamber,
    generating a signal indicative of the compaction of said crop material in said region, and
    repositioning said round baler in response to said signal to maintain said compaction at a predetermined level.

10. A method as set forth in claim 9 including the step of
    observing the signal being generated and the variations therein.

11. A method as set forth in claim 9 wherein the generating step is performed by continuously generating a signal indicative of the compaction of crop material in said region during bale formation.

12. A method as set forth in claim 11 wherein the sensing step is further performed by sensing the compaction of the crop material that is forming the end of the bale.

13. A method as set forth in claim 12 wherein said generating step is performed by generating signals indicative of the compaction of both ends of the bale as it is being formed, and by indicating the relative degree of compactness above said predetermined level.

14. A method as set forth in claim 13 wherein the repositioning step is performed by repositioning the baler in response to said signals indicative of the relative level of compactness above said predetermined level, and by steering the baler to the side at which the lower level of compactness is indicated.

* * * * *